United States Patent [19]
Appell et al.

[11] Patent Number: 5,051,018
[45] Date of Patent: Sep. 24, 1991

[54] COUPLING

[75] Inventors: Bo Appell; Curt Falk, both of Hudiksvall, Sweden

[73] Assignee: Metalform Safeset AB, Sweden

[21] Appl. No.: 584,006

[22] Filed: Sep. 18, 1990

[30] Foreign Application Priority Data

Sep. 19, 1989 [SE] Sweden ................................ 8903077

[51] Int. Cl.⁵ ............................................. F16D 9/00
[52] U.S. Cl. ...................................................... 403/5
[58] Field of Search ............................................. 403/5

[56] References Cited

U.S. PATENT DOCUMENTS

| 4,264,229 | 4/1981 | Falk et al. | 403/5 |
| 4,705,421 | 11/1987 | Depping | 403/5 X |
| 4,752,275 | 6/1988 | Lindenthal et al. | 403/5 X |
| 4,923,320 | 5/1990 | Klischat | 403/5 |

Primary Examiner—Andrew V. Kundrat
Attorney, Agent, or Firm—Sughrue, Mion, Zinn, Macpeak & Seas

[57] ABSTRACT

A coupling for coupling together two mutually coaxial, rotatable parts, comprising a substantially cylindrical coupling member which is intended to be mounted between the parts to be coupled together and which is expandable both radially outwards and radially inwards so as to exert on the parts a coupling pressure through the intermediary of the coupling member. The coupling member incorporates a pressure chamber which is intended to be supplied with pressure fluid for expansion of the coupling member and which is provided with a pressure relief device which is triggered upon relative rotation of the aforementioned parts. The coupling member is configured to exert a greater coupling force on a first of the aforementioned parts than on the other of these parts, and the pressure relief device is intended to be activated upon relative rotation between the first part and the coupling member, but to permit rotation between the other of the parts and the coupling member.

8 Claims, 2 Drawing Sheets

COUPLING

BACKGROUND OF THE INVENTION

The present invention relates to a coupling for coupling together two mutually coaxial, rotatable parts, e.g. a shaft and a hub, comprising a substantially cylindrical coupling member which is intended to be positioned between the parts to be coupled together and which is expandable both radially outwards and radially inwards so as to exert on said parts a coupling pressure through the intermediary of the coupling member and optionally through the intermediary of intermediate members, and in which the coupling member incorporates a pressure chamber which extends along said member and which is intended to be supplied with a pressure fluid to effect said expansion of the coupling member and which is provided with a pressure relief device which is triggered upon relative rotation of said parts.

Such a coupling is known to the art from UK Patent Specification No. 2 023 250, for instance. In the case of this known coupling, a shaft or axle is coupled to a hub with the aid of a radially inwards and outwards expandable, cylindrical coupling member, wherewith it is ensured that the coupling will exert a greater coupling force between itself and the hub than between itself and the shaft, among other things by mounting an intermediate sleeve between the outside of the shaft and the inside of the coupling member. In the event of an overload, the shaft will therefore rotate relative to the coupling and the hub mounted thereon, whereupon a pressure-relief device operative between the shaft and the coupling is triggered and causes the hub, coupling and shaft to disengage one from the other.

In some transmission systems, torque peaks of very short duration will occur, e.g. durations typically in the order of 1-100 milliseconds. Typical machines which include such transmission systems are electrical generators driven by wind power, diesel engines and gas-turbines. There are two reasons for the occurrence of extremely high torque peaks of short duration in such machines. One of these reasons is the occurrence of short circuits in the electrical system and the other is the result of faulty in-phasing on an electric network. Other types of operation in which such high torque peaks can occur are the use of frequency-controlled inductance motors to achieve high power outputs, e.g. for driving high speed locomotives and rolling mills.

The techniques used at present to overcome problems of high torques of short duration (torques which are ten times the normal torque are common) involve:

1. Overdimensioning the transmission system, so that the system is able to handle the torque peaks. The drawback with this solution, however, are that overdimensioning is expensive and results in a system of undue weight.

2. The use of shear-pin couplings or like devices. The drawback here is that it is necessary to re-establish couplings manually, which results in non-productive downtime periods, which can be very expensive, particularly in the case of unmanned systems.

3. The use of disc-type friction couplings. The drawback here is the very large coupling diameters required and the resultant large flywheel mass, which in the majority of cases renders this type of solution impracticable.

SUMMARY OF THE INVENTION

The object of the present invention is to provide a novel and useful coupling which will solve the problem of high torque peaks of short duration of the aforesaid kind and which will eliminate the aforesaid drawbacks, at least to a substantial extent.

Accordingly, there is proposed in accordance with the invention a coupling of the kind disclosed in the introduction, wherein the coupling member is so configured that it exerts a greater coupling force on a first of said parts than on a second of said parts, and wherein the pressure relief device in constructed to be triggered upon relative rotation between said first part and the coupling member but to permit rotation between said second part and the coupling member. In the event of an overload, the coupling will slip in the coupling region where the torque causing the coupling to slip has its lowest value, i.e. between the coupling member and said second part. In the case of brief overloads of the kind that occur with the application concerned here, the coupling will only slip for a fraction of one revolution, or in exceptional cases one or two revolutions, which the coupling is able to withstand without activation of the pressure relief device. However, in the event of an overload of long duration caused, for instance, by a bearing failure, the coupling will slip for several revolutions and, as a result of the relatively high pressure used in couplings of this kind, high temperatures are quickly generated in the region between the coupling member and said second part as a result of friction, with the subsequent tendency of said second part to weld to or seize on the coupling member. As a result, a higher torque will be transmitted through the coupling, this higher torque exceeding the coupling force acting between the coupling member and said first coupling part, so that said member and said first coupling part will rotate relative to one another and trigger the pressure relief device. Triggering of the pressure relief device can result in damage to the coupling and to said second part. Although the need for activation of the pressure relief device in the case of the aforesaid applications is extremely remote (e.g. perhaps once in 50 to 100 years), from the aspect of risk analysis the risk is still sufficiently high to warrant the inclusion of the additional safety function afforded by the possibility of triggering the safety relief device, particularly in view of the high cost of the systems concerned.

The inventive coupling provides one or more of the following advantages, in comparison with the known solutions for dealing with high torque peaks:

1. A very compact construction, which enables the inventive coupling to be used with all manner of applications.

2. The coupling need not normally be re-established after a slip has occurred (the need for re-establishing the coupling is less than 1% of the cases that occur).

3. The coupling requires the minimum of maintenance.

The requisite difference in the coupling force between, on the one hand, the coupling member and the said first part, and the coupling member and said second part on the other hand, can be achieved in any suitable manner, of which several appropriate methods are set forth in the depending claims and can be applied individually or in combination.

In order to minimize the risk of damage to the coupling member and said second part as a result of mutual slipping of said member and said part when high torque peaks of short duration occur, the contact surface between the coupling member and said second part is preferably lubricated.

The present invention will now be described in more detail with reference to a number of exemplifying embodiments thereof illustrated in the accompanying drawings.

DETAILED DESCRIPTION OF THE PREFERRED EMBODIMENT

Figure 1:
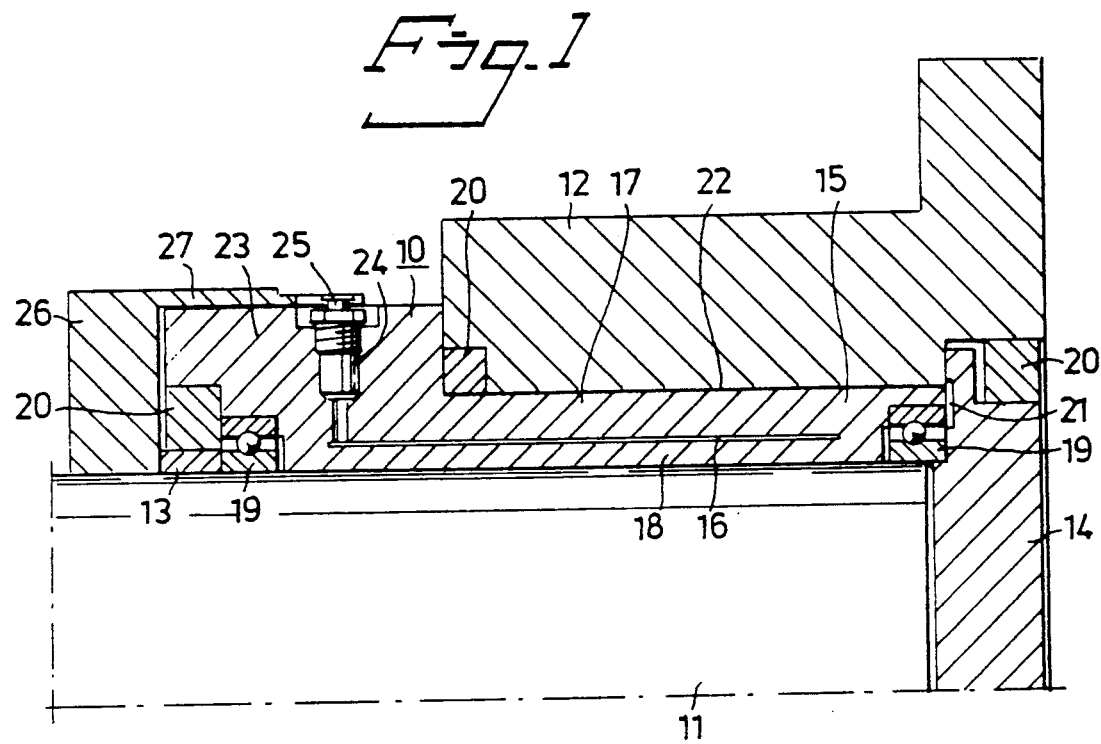
FIGS. 1-4 show fragmentary axial section views of a first, a second, a third and fourth exemplifying embodiment of the inventive coupling. Identical reference numerals have the same significance in the various Figures.

In FIG. 1 the reference numeral 10 identifies generally a coupling which is intended for coupling a first part 11, in the form of a shaft or axle, to a hollow second part 12, in the form of a hub. The coupling 10 is held axially on the shaft 11 between a ring 13 mounted on the shaft and a circular plate 14 attached to one end of the shaft. The coupling 10 includes a cylindrical coupling member 15 which accommodates therein a closed, cylindrical and elongated pressure medium chamber 16, which is defined radially outwards and inwards by two, relatively thin-walled sleeve-like parts 17 and 18 of the coupling member 15. Bearings 19, preferably mounted in lubricant-containing spaces, are mounted between the shaft 11 and the coupling 10, leakage of the lubricant being prevented by seals 20. A connecting passage 21 formed in the plate 14 permits the passage of lubricant to a cylindrical gap 22 between the coupling member 15 and the hub 12.

The cylindrical coupling member 15 has a thickened end-part 23, in which there is fitted a device 24 for supplying pressure medium, e.g. oil, to the chamber 16. The device 24 includes a fracture pipe 25 which if fractured or punctured brings the chamber 16 into communication with the coupling surroundings. A ring 26 rigidly mounted on the shaft 11 carries an arm 27 having a forked end with which the arm engages the pipe 25 and fractures or punctures the same in the event of relative rotation between the shaft 11 and the coupling 10. When pressure medium is introduced under high pressure into the chamber 16, the coupling member 15 will expand radially outwards and inwards, through the elastic deformation of the sleeve-like parts 17 and 18, while coupling the shaft 11 to the hub 12 through the medium of the coupling member 15. The wall thickness of the sleeve-like part 17 is so much greater than the wall thickness of the part 18 that when a predetermined pressure prevails in the chamber 16, the hub 12 will be coupled to the coupling member 15 at a desired coupling force, which is smaller, to a desired extent, than the coupling force obtained at the same time between the coupling member 15 and the shaft 11. Consequently, rotation of the hub 12 relative to the coupling member 15 requires a first, predetermined torque which is smaller than a second predetermined torque required to rotate the shaft 11 relative to the coupling member 15.

Accordingly, rotation of the shaft 11 relative to the coupling member 15 will cause triggering of the pressure relief device formed by the fracture pipe 25, the ring 26 and the arm 27, so as to terminate the coupling force generated by the pressure medium in the chamber 16 and enable the coupling 10 to rotate freely on the shaft 11 resting on the bearings 19. It will be understood that the aforesaid first torque will be smaller than the value of occurrent high torque peaks of short duration. When the value of said first and said second torque is exceeded over a longer duration, the hub 12 will fasten to the coupling member 15 and rotate said member 15 and the shaft 11 relative to one another, so as to activate the pressure relief device 25-27.

Figure 2:
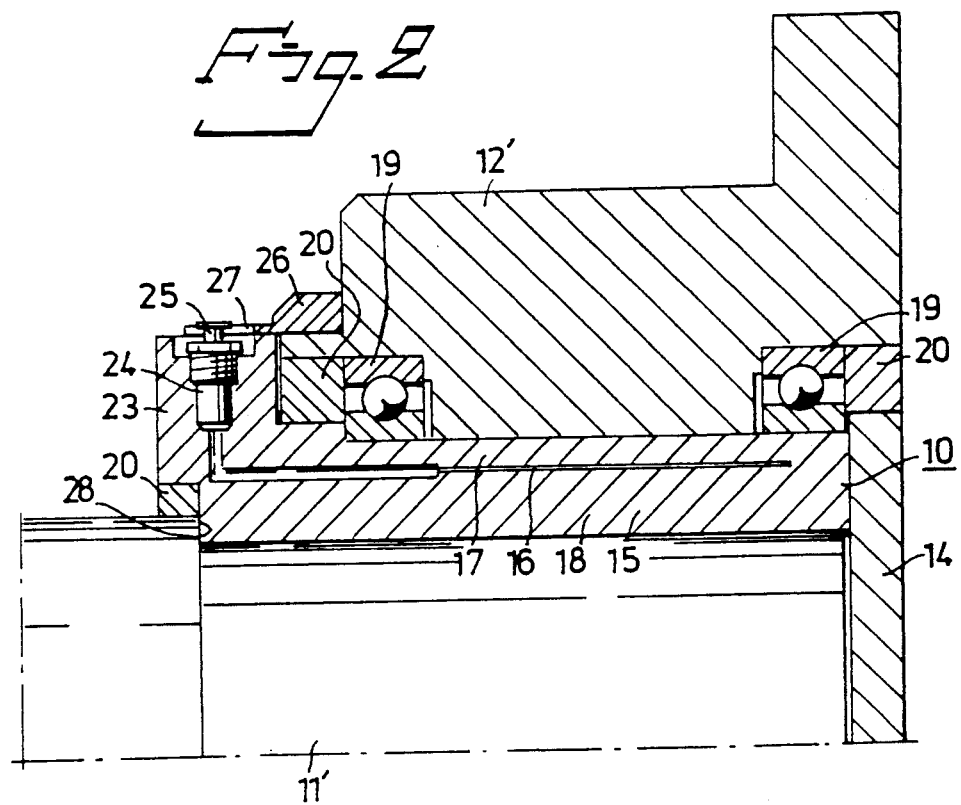

In the case of the FIG. 2 embodiment, the coupling 10 acting between the shaft 11' and the hub 12' is located between a shoulder 28 on the shaft 11' and the plate 14. The sleeve-like part 17 of this embodiment is much thinner than the sleeve-like part 18, so that the coupling force between the coupling member 15 and the hub 12' will be greater than the coupling force between said member 15 and the shaft 11' when pressure medium is introduced into the pressure chamber 16. The bearings 19 are positioned between the coupling member 15 and the hub 12'. The hub carries the ring 26 and the arm 27 of the pressure relief device 25-27. Thus, in the case of a low torque the shaft 11' is able to rotate relative to the coupling member 15, whereas in the case of a high torque, the shaft 11' will weld to or seize on the coupling member 15, which is then rotated relative to the hub 12' and results in triggering of the pressure relief device 25-27, so that the bearings 19 carried by the hub 12' are able to rotate freely on the coupling member 15.

Figure 3:
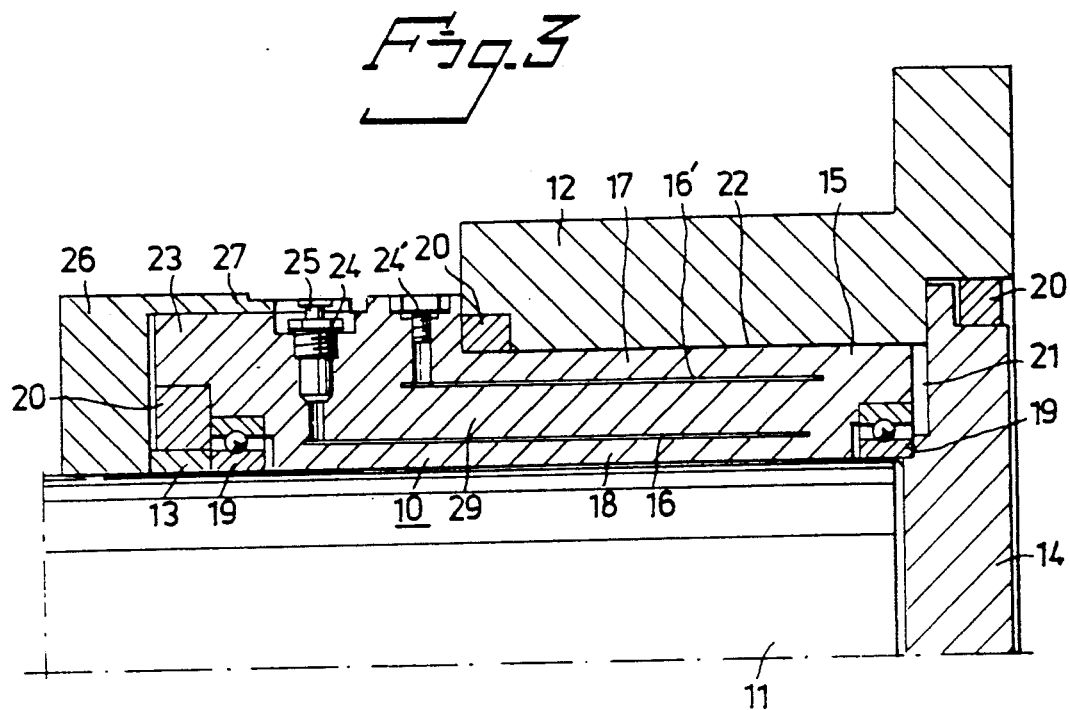

The coupling arrangement illustrated in FIG. 3 coincides with the arrangement shown in FIG. 1, with the exception that the sleeve-like parts 17 and 18 each form defining walls of a respective pressure medium chamber 16' and 16 respectively, each having a respective pressure-medium supply means 24' and 24 respectively. A defining wall which is common to both pressure medium chambers 16, 16' is referenced 29. The pressures in the two chambers 16' and 16 are adapted so that the coupling force acting between the hub 12 and the coupling member 15 will be smaller than the coupling force acting between the shaft 11 and the coupling member 15, and solely the pressure-medium supply means 24 is arranged to coact with a pressure relief device 25-27.

Figure 4:
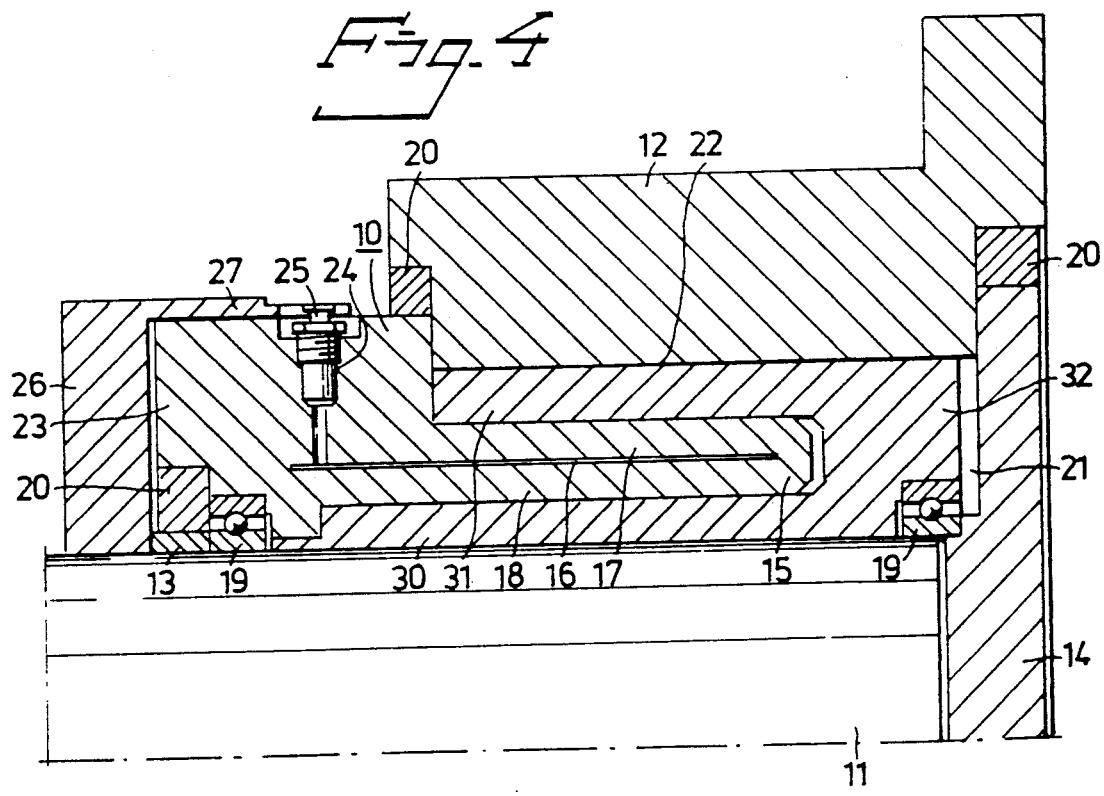

The coupling arrangement illustrated in FIG. 4 coincides with the arrangement illustrated in FIG. 1, with the exception that the coupling member 15 acts on the shaft 11 and the hub 12 through an intermediate members 30 and 31. In the illustrated embodiment, these intermediate members are formed by the two legs of a single U-section ring-element 32, which is carried by the shaft 11, together with the coupling 10, via the bearings 19. This arrangement of the illustrated intermediate-member construction avoids the risk of damage to the coupling member 15 and the shaft 11 in the event of the coupling 10 being triggered.

It will be understood that the invention is not restricted to the aforedescribed and illustrated embodiments thereof and that modifications and changes can be made within the scope of the inventive concept defined in the following claims.

We claim:

1. A coupling for coupling together a first shaft-like part and a second hub-like part that are coaxially and rotatably disposed with respect to one another, comprising:

a substantially cylindrical coupling member circumscribing said first part and disposed between said first and second parts, said coupling member including:

means for expanding said coupling member both radially inwardly and radially outwardly so as to respectively exert an inward force on said first part and an outward force on said second part, one of said inward force and said outward force being greater than the other of said inward force and said outward force such that said coupling member exerts a greater force on one of said first and second parts on the other of said parts;

means for detecting relative rotational motion between said coupling member and said one part and for eliminating said inward and outward forces when motion is detected; said coupling member being rotatable relative to said other part in response to a torque less than that necessary to produce said relative rotational motion.

2. The coupling of claim 1, wherein said expanding means comprises:

an elongate, annual pressure chamber disposed in said coupling member to define an outer sleeve and an inner sleeve extending longitudinally between said first part and said second part; and means for supplying oil pressure to said chamber so as to cause said inner and outer sleeves to respectively expand inwardly and outwardly.

3. The coupling of claim 2, wherein one of said inner and outer sleeves has a greater radial thickness than the other of said inner and outer sleeves such that when said oil pressure is applied to said pressure chamber, said one sleeve deforms less than said other sleeve so as to exert a smaller force than said other sleeve.

4. The coupling of claim 3 wherein the radial thickness of said inner sleeve is greater than the radial thickness of said outer sleeve.

5. The coupling of claim 3, wherein the radial thickness of said outer sleeve is greater than the radial thickness of said inner sleeve.

6. The coupling of claim 2, wherein the area in which said inner sleeve contacts said first part is greater than the area in which said outer sleeve contacts said second part.

7. The coupling of claim 1, wherein said expanding means comprises:

inner and outer elongate, annular pressure chambers disposed in said coupling member to define an inner sleeve, an outer sleeve and an intermediate sleeve disposed between said inner and outer sleeves, each of said sleeves extending longitudinally between said first and second parts; and means for supplying oil pressure to said pressure chambers, pressure applied to said inner chamber causing said inner sleeve to expand inwardly against said first part and pressure applied to said outer chamber causing said outer sleeve to expand outwardly against said second part.

8. The coupling of claim 7 wherein said eliminating means comprises a pressure relief device communicating with said inner chamber which relieves pressure in said inner chamber when said detecting means detects relative motion between said first and second parts.

* * * * *